United States Patent [19]

Strong

[11] 4,322,396
[45] Mar. 30, 1982

[54] HIGH PRESSURE REACTION VESSEL FOR GROWING DIAMOND ON DIAMOND SEED AND METHOD THEREFOR

[75] Inventor: Herbert M. Strong, Schenectady, N.Y.

[73] Assignee: General Electric Company, Worthington, Ohio

[21] Appl. No.: 148,213

[22] Filed: May 9, 1980

Related U.S. Application Data

[63] Continuation of Ser. No. 544,493, Jan. 27, 1975, abandoned, which is a continuation of Ser. No. 412,424, Nov. 2, 1973, abandoned.

[51] Int. Cl.³ .............................................. C01B 31/06
[52] U.S. Cl. ....................................... 423/446; 206/525; 422/129; 422/240; 425/77
[58] Field of Search ................... 423/446; 206/525; 422/129, 240, 242; 425/77

[56] References Cited

U.S. PATENT DOCUMENTS

| | | | |
|---|---|---|---|
| 3,297,407 | 1/1967 | Wentorf | 423/446 |
| 3,303,053 | 2/1967 | Strong et al. | 423/446 X |
| 3,317,035 | 5/1967 | Cannon | 423/446 X |
| 3,346,102 | 10/1967 | Strong | 423/446 X |
| 3,423,177 | 1/1969 | Bovenkerk | 423/446 |
| 4,287,168 | 9/1981 | Wentorf et al. | 423/446 |

OTHER PUBLICATIONS

Armagnac "Popular Science" and vol. 197, No. 3, 1970, pp. 82, 83, 134 and 137.

*Primary Examiner*—Edward J. Meros
*Attorney, Agent, or Firm*—Morgan, Finnegan, Pine, Foley & Lee

[57] ABSTRACT

Reaction vessel construction is described for suppressing spontaneous diamond nucleation and simultaneously reducing the flaw content in the main body of diamond grown from diamond seed material by the process broadly disclosed in U.S. Pat. No. 3,297,407 to Wentorf, Jr.

In the reaction vessel construction the body of catalyst-solvent metal is formed with at least one small tip projecting from the underside thereof. A single diamond seed is placed in contact with this (or each) tip. The underside of the plug of catalyst-solvent metal is in contact with a nucleation-suppressing disc, or layer, of a material different from the catalyst-solvent and selected from a specific group of materials. In each case the tip of catalyst-solvent metal projects through a hole in the disc or layer to make contact with the diamond seed material.

14 Claims, 3 Drawing Figures

HIGH PRESSURE REACTION VESSEL FOR GROWING DIAMOND ON DIAMOND SEED AND METHOD THEREFOR

This is a continuation of application Ser. No. 544,493 filed Jan. 27, 1975, now abandoned, a continuation of Ser. No. 412,424, filed Nov. 2, 1973, now abandoned.

BACKGROUND OF THE INVENTION

The synthesis of diamond crystals by high pressure, high temperature processes has become well established commercially. Preferred methods for making diamonds are disclosed and claimed in U.S. Pat. No. 2,947,610 to Hall et al and No. 2,947,609 to Strong. Apparatus for the conduct of such processes is described and claimed in U.S. Pat. No. 2,941,248 to Hall. The Hall et al, Strong and Hall patents are incorporated by reference.

Diamond growth in the aforementioned processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite (the typical starting material) and the diamond being formed. This solubility difference is generally susceptible to significant decrease over any extended period due to a decrease in pressure in the system and/or poisoning effects in the graphite being converted.

On the other hand, in the method of growing diamond on a diamond seed crystal disclosed in U.S. Pat. No. 3,297,407 to Wentorf, Jr. (incorporated by reference) a difference in temperature between the diamond seed and the source of carbon is relied upon to establish a concentration gradient in carbon for deposition on the seed. Catalyst-solvents disclosed in the aforementioned Hall et al and Strong patents are used in the temperature gradient method as well. The growth of diamond on the seed material is driven by the difference in solubility of diamond in the molten catalyst-solvent metal at the nutrient (source of carbon) and at the seed, between which locations a temperature gradient exists. More important, this general type of reaction vessel configuration presents a pressure stable system so that pressure can more readily be kept in the diamond stable region.

By very carefully adjusting pressure and temperature and utilizing relatively small temperature gradients with extended (relative to growth times for thin film method) growth times larger diamonds can be produced by the method as taught in the Wentorf patent than by the thin-film method. However, attempts to increase crystal sizes to much greater than about 1/20 carat (by increasing the growth times by 5 to 10 times the aforementioned "extended" growth times) has shown that with these longer growth times the strong tendency for spontaneous nucleation of diamond crystals to occur at the underside of the molten catalyst-solvent metal develops into a serious problem, because that diamond nucleation occurring near the diamond seed material competes with the growth from the seed diamond resulting in the development of multiple crystals which collide as they grow and as a consequence produce stress fractures in the colliding crystals.

SUMMARY OF THE INVENTION

The instant invention provides a solution to minimizing the flaw content of the main body of new growth proceeding from a seed crystal and incorporates in combination therewith means for suppressing spontaneous diamond nucleation in the vicinity of the diamond seed material.

In the reaction vessel construction of the instant invention the body of catalyst-solvent metal is formed with at least one small tip projecting from the underside thereof. A single diamond seed is placed in contact with this (or each) tip. The underside of the plug of catalyst-solvent metal is in contact with a nucleation-suppressing disc, or layer, of a material different from the catalyst-solvent and selected from a specific group of materials. In each case the tip of catalyst-solvent metal projects through a hole in the disc or layer to make contact with the diamond seed material.

BRIEF DESCRIPTION OF THE DRAWING

This invention will be better understood from the following description and drawing in which.

DESCRIPTION OF THE PREFERRED EMBODIMENT

One preferred form of a high pressure, high temperature apparatus in which the reaction vessel of the instant invention may be employed is the subject of the aforementioned U.S. Pat. No. 2,941,248 to Hall and is schematically illustrated in FIG. 1.

Figure 1:
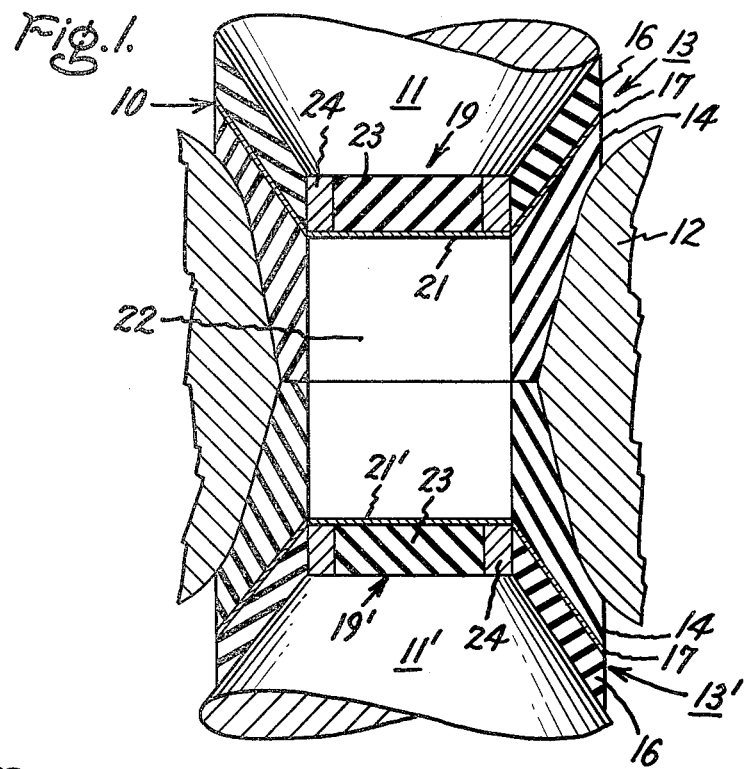
FIG. 1 illustrates one exemplary high pressure, high temperature apparatus useful in the practice of this invention.

In FIG. 1, apparatus 10 includes a pair of cemented tungsten carbide punches 11 and 11' and an intermediate belt or die member 12 of the same material. Die member 12 defines a centrally-located aperture and in combination with punches 11, 11' defines a pair of annular volumes. Between punch 11 and the die 12 and between punch 11' and the die 12 there are included gasket/insulating assemblies 13, 13', each comprising a pair of thermally insulating and electrically non-conducting pyrophyllite members 14 and 16 and an intermediate metallic gasket 17. The aforementioned assemblies 13, 13' together with end cap assemblies 19, 19' and electrically conductive metal end discs 21, 21' serve to define the volume 22 occupied by reaction vessel 30. Each end cap assembly comprises a pyrophyllite plug, or disc, 23 surrounded by an electrical conducting ring 24.

Reaction vessel 30 (FIG. 2) is of the general type disclosed in U.S. Pat. No. 3,030,662 to Strong (incorporated by reference) modified by the addition of steel retaining rings 31 and 32. Hollow cylinder 33 is preferably made of pure sodium chloride, but may be made of other material such as talc.

Broad criteria for the selection of the material for cylinder 33 are that the material (a) not be converted under pressure to a stronger and stiffer state as by phase transformation and/or compaction and (b) be substantially free of volume discontinuities appearing under the application of high temperatures and pressures, as occurs for example with pyrophyllite and porous alumina.

The materials meeting the criteria set forth in U.S. Pat. No. 3,030,662 (column 1, line 59 through column 2, line 2) are useful for preparing cylinder 33. Positioned concentrically within and adjacent cylinder 33 is a graphite electrical resistance heater tube 34. Within graphite heater tube 34 there is in turn concentrically positioned cylindrical salt liner plug 36 upon which are positioned hollow salt cylinder 37 and its contents.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention. Pressures, temperatures, metallic catalyst-solvents and calibrating techniques are disclosed in the aforementioned patents incorporated by reference.

The bottom end of cylinder 37 encloses the embedment disc 38 having diamond seed 39 embedded therein. Designations of the diamond seed are schematic and no attempt has been made to show the preferred disposition. Nucleation suppressing layer 41 is disposed in contact with the bottom of plug 42 of metallic catalyst-solvent and between plug 42 and disc 38. Nib 42' of plug 42 projects through a hole in layer 41 into disc 38 to make contact with one exposed face (preferably the cube face) of diamond seed 39. More than one such nib 42' may be used, if desired, in which case a separate seed will be provided for each nib 42'. This disposition of parts may be best seen in FIG. 3. Also located within salt cylinder 37 are the nutrient supply 43 and salt cylinder 44 disposed thereover.

The temperature differential between the hot part of the cell (about half-way up the height of the cell) and the diamond pocket is preferably in the range of 20°–30° C. This differential depends upon the construction of the cell e.g. depth and location of mass of metallic catalyst-solvent, differential resistance in the heater tube, thermal conductivity of the end discs etc. Thus, the thickness and vertical placement of plug 41 helps determine the temperature differential prevailing in the reaction vessel. With a thicker mass of catalyst-solvent the temperature difference is greater.

Pressure-transmitting members 36, 37, 38 and 44 are made of material meeting the same criteria as the material for cylinder 33. All of parts 33, 36, 37, 38 and 44 are dried in vacuum for at least 24 hours at 100° to 200° C. before assembly. Other combinations of shapes for the pressure-transmitting members may, of course, be employed. For example, it may be simpler to make cylinder 37 just long enough to enclose elements 38, 41, 42 and 43 in which case element 44 will be made with a large enough diameter to fit closely within heater tube 34.

When reaction vessel 30 is disposed in space 22, heater tube 34 forms electrical contact between end discs 21, 21' so that heat may be controllably applied during conduct of the process.

Nucleation suppressing layer 41 is composed of a material different from the catalyst-solvent material chosen for mass 42 and is selected from the group consisting of cobalt, iron, manganese, titanium, chromium, tungsten, vanadium, niobium, tantalum, zirconium, alloys of the preceding metals, mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family. Preferably, in the last instance silicon carbide particles are mixed with an inert material such as sodium chloride and formed as a solid disc having the upper surface thereof (in contact with the underside of plug 42) covered with a thin layer of one of the platinum family metals.

The nutrient material 43 may be composed of diamond, diamond plus graphite or may be entirely of graphite, if desired. The graphite occupies any void space between diamond crystals. It is preferred that the nutrient contain mostly diamond in order to reduce the volume shrinkage that can result during conduct of the process. In the conduct of the process any graphite present at operating temperatures and pressures converts to diamond before going into solution in the catalyst-solvent metal. Thus, the pressure loss is minimized so that the overall pressure remains in the diamond-stable region at the operating temperature.

Figure 2:
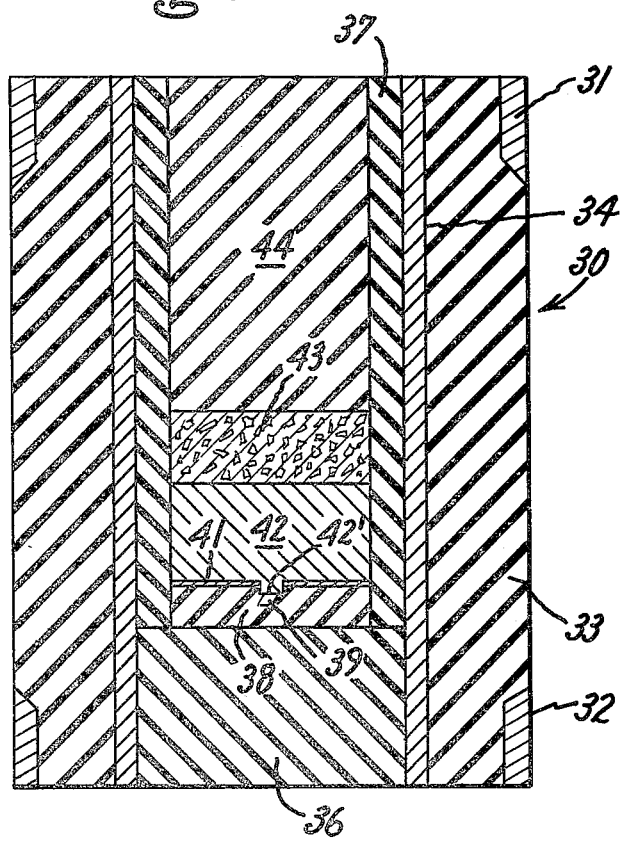
FIG. 2 illustrates in an enlarged view a preferred reaction vessel construction assembled in accordance with this invention and FIG. 3 is an even larger scale view of the vicinity of the diamond seed material shown in FIG. 2.
Figure 3:
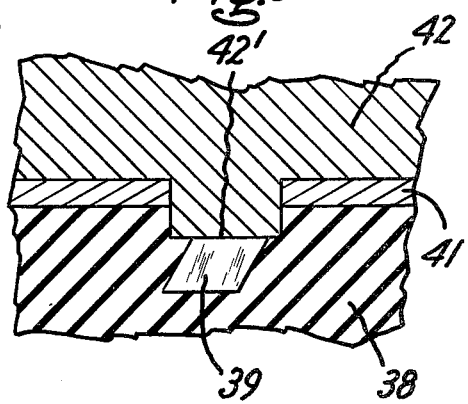

The reaction vessel construction shown in FIGS. 2 and 3 simultaneously functions both to suppress spontaneous diamond nucleation and to reduce the flaw content in the main body of diamond grown from a diamond seed. Preferably, the surface of the underside of catalyst-solvent metal plug 42 (with the exception of nib 42') is covered by layer 41 (or a disc 41) to provide an environment adjacent the seed 39 to suppress spontaneous diamond nucleation for a considerable distance around diamond seed 39. Thus, the layer 41 should extend at least a 50% greater distance from the seed in all directions over the underside of plug 42 than the lateral growth dimension of diamond desired. In the construction of FIGS. 2 and 3, if the disc 41 is made of one of the metallic materials listed above, there must be space between the diamond seed 39 and the closest portion of disc 41 and the material of disc 38 will extend into this space. When layer 41 is provided with a circular hole the ratio of diameter of the hole to largest dimension of seed 39 should be in the range of 1.5:1 to 5:1.

Experiments with different reaction vessel constructions have verified the excellent nucleation suppressing capabilities of cobalt and natural mica and the useful nucleation suppressing capabilities of tungsten. In the same manner the lack of utility of synthetic mica, platinum and nickel (as well as molybdenum, see EXAMPLE 1) as nucleation suppressing materials has been demonstrated.

The exact mechanism (or mechanisms) by which discs, or layers, of these diamond nucleation suppressor materials located in the manner described function to reduce or eliminate diamond nucleation in the vicinity of the diamond seed 39 is not known for certain. However, it has been found that in this way diamond nucleation can be held back at least until the seeded growth becomes quite large, well formed and capable of accepting the full carbon flux presented thereto during operation at temperature differentials with which in identical systems without the nucleation suppression disc, spurious diamond nucleation resulted in a clustered mass of diamond growth.

With respect to the growth flaws it has been found that by placing the small projection or lump of catalyst-solvent metal 42' into contact with the diamond seed material, the starting growth flaws collect in this small protrusion. By the time the diamond growth has advanced through nib 42' and has reached the main pool of catalyst-solvent metal 42 the proper growth pattern is established and flaw-free (or substantially flaw-free)

growth occurs from this point on as the continuing new growth enlarges and projects into pool 42.

After termination of the run and reduction of temperature and pressure to permit removal of the reaction vessel 30, the new diamond growth embedded in the solidified metallic catalyst-solvent 42 readily detaches from the seeding site(s) with the separation occurring between the seed and initial diamond growth in nib portion. The diamond(s) so prepared is easily removed by breaking open the mass 42.

If nib 42' is made as a circular cylinder, the diameter thereof will be in the range of from greater than 0.020" to 0.100". For nibs prepared in other configurations the cross-sectional area transverse to the axis of reaction vessel 30 at some location along the nib should be the equivalent of a circular cross-section having a diameter in the range of from greater than 0.020" to 0.100". When cylindrical nibs having a diameter greater than 30 mils (0.030") have been used, a projection of diamond solidly attached to the new diamond growth develops from the former nib. This projection contains the starting growth flaws and would be ground off in converting the new diamond growth into some desired configuration, e.g. a gem cut.

The height (from seed 39 to mass 42) of nib 42' should be in the range of from about 30 to about 60 mils. As an example of a non-cylindrical nib, nib 42' may be conical with the point thereof in contact with seed 39. Also, nib 42' need not be made integral with mass 42, but may initially be a separate lump therefrom and in direct contact therewith, so long as it is made of, or contains sufficient, catalyst-solvent. For example, a catalyst-metal lump interconnecting mass 42 and seed 39 could be in the shape of a cube, sphere or other shape made of nickel or certain nickel-iron alloys providing that a large enough seed diamond is used to survive loss of carbon to the lump. The catalyst-solvent of which such a separate slug is made (or which the slug contains) in a given reaction vessel construction should have a melting point when in contact with diamond which is higher than the melting point of the mass of catalyst metal 42 when in contact with diamond.

Because of this capability of nib 42' to collect initial growth flaws, if a large enough seed diamond is used, some etching of the diamond by the nib metal can be tolerated in exchange for the gain in time afforded to this construction.

In each of the following examples the reaction vessel configuration provided a temperature differential in the 20°–30° C. range, the nutrient consisted of 1 part by weight SP-1 graphite (National Carbon Company) and 3 parts by weight 325 mesh diamond prepared by the thin film method, seeds used were ¼ to ½ mm, the catalyst-solvent is 70 Ni 30 Fe and temperatures were measured using a Pt/Pt 10 Rh thermocouple:

| EXAMPLE 1 [Run 908] | |
|---|---|
| Pressure | 56 kb |
| Temperature (14.2 mv) | 1430–1450° C. |
| Nutrient | 210 mgm |
| Nucleation Suppressing Layer | 10 mil Mo disc with hole for nib as in FIG. 2 |
| Nib Description | 40 mil diameter × 10 mils in height; integral with mass 42 |
| Time | 45⅝ hours |

| -continued | |
|---|---|
| EXAMPLE 1 [Run 908] | |
| Weight of Seeded Growth | about 60 mgm |

In spite of the failure of the Mo disc as a nucleation suppressing material, a beautiful, yellow, clear growth developed from the seed. Four other diamond crystals grew spontaneously, collided and interfered with optimum seed growth. The nib did function well to prevent flawing in the growth extending into bath 42, however. The seeded growth was in the shape of a truncated octahedron with modifying cube faces.

| EXAMPLE 2 [Run 904] | |
|---|---|
| Pressure | 57 kb |
| Temperature (14.1 mv) | 1420–1440° C. |
| Nutrient | 210 mgm |
| Nucleation Suppressing Layer | 2–5 mil Fe discs one over the other with 40 mil hole in center for nib as in FIG. 2 |
| Nib Description | 40 mil diameter × 10 mils in height, integral with mass 42 |
| Time | 41¼ hours |
| Weight of Seeded Growth | 96 mgm |

A beautiful clear light yellow crystal grew from the seed diamond. No spontaneous diamond nucleation occurred. The crystal was in the shape of a truncated octahedron with modifying cube faces. Nib 42' successfully prevented significant flawing in the initial growth of the crystal.

Thus, by making available both the capability for suppressing diamond nucleation and that of eliminating growth flaws from the main body of the new growth a very significant improvement in the controlled growth of large diamonds from diamond seed material has been attained.

What I claim as new and desire to secure by Letters Patent of the United States is:

1. In a diamond synthesis reaction vessel for introduction into the reaction volume of a high pressure, high temperature apparatus, said reaction vessel constituting an assembly of interfitting elements for enclosing diamond seed material and a source of substantially pure carbon, said diamond seed material and said source of carbon being separated by a mass of metallic catalyst-solvent material for the diamond-making reaction disposed therebetween so as to provide a predetermined temperature gradient between said diamond seed material and said source of carbon under operating conditions of pressure and temperature above the graphite-to-diamond equilibrium line on the phase diagram of carbon, said diamond seed material and said source of carbon being located in separate regions of said reaction vessel such that under said operating conditions said diamond seed material will be heated to a temperature near the minimum value of temperature for said temperature gradient and simultaneously said source of carbon will be heated to a temperature near the maximum value of temperature for said temperature gradient, the combination with said interfitting elements of (a) a layer of diamond nucleation suppressing material disposed in direct contact with the underside of the mass of metallic catalyst-solvent material, said nucleation suppressing layer being made of a material different from the catalyst-solvent material and being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of the preceding metals, said metal capable of holding back diamond nucleation thereby suppressing unwanted spontaneous diamond nucleation; and (b) at least one small lump containing metallic catalyst-solvent material, said lump extending through said nucleation suppressing layer to interconnect said mass of metallic catalyst-solvent material and a single diamond seed, said lump having a cross-sectional area equivalent to a circular area having a diameter ranging from greater than 0.020" to 0.100" and having a height ranging from about 30 to about 60 mils.

2. The combination as recited in claim 1 wherein the lump containing metallic catalyst-solvent material is a small projection formed integral with the mass of catalyst metal material.

3. The combination recited in claim 1 wherein the diamond seed is oriented with a cube face thereof in contact with the lump of metallic catalyst-solvent material.

4. The combination recited in claim 1 wherein the nucleation suppressing layer is cobalt.

5. The combination recited in claim 1 wherein the nucleation suppressing layer is iron.

6. A process for the production of diamond material comprising the steps of: pressurizing a reaction vessel containing a diamond seed material and a source of carbon separated by a mass of catalyst-solvent to a pressure in the diamond stable region of the phase diagram for carbon; while simultaneously heating said reaction vessel in such a manner to create within said vessel a temperature gradient in said diamond stable region such that the diamond seed material is at a temperature near the minimum temperature of said gradient and said source of carbon is at a temperature near the maximum temperature of said gradient, whereby a temperature gradient is created between said seed material and carbon source; inducing diamond growth from the seed material by the use of a nib of catalyst-solvent extending from said mass of catalyst-solvent into contact with the seed material such that starting growth flaws collect in said nib, said nib having a cross-sectional area equivalent to a circular area having a diameter greater than 0.020 inch, and inhibiting diamond growth with the use of a nucleation suppression material different from said catalyst-solvent, said nucleation suppression material being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of these metals, and located at the periphery of the induced growth site in said nib under the operating conditions while a substantial diamond growth pattern is developing from said induced growth site, said metal capable of holding back diamond nucleation thereby suppressing unwanted spontaneous diamond nucleation whereby diamond growth greater than about 1/20 carat is produced.

7. A process as defined in claim 6 wherein said inhibiting step includes the step of using said material in the vicinity of said seed material for a distance of at least 50% greater than the lateral growth dimension of the diamond to be grown.

8. A process of claim 6 wherein said inhibiting step includes the step of using said material in layer form, said layer defining a hole which is circular and the ratio of the lateral dimension of the hole to the largest dimension of the seed material is in the range of 1.5:1 to 5:1, said seed material being aligned with said hole.

9. A process of claim 6 wherein said nib has a height dimension in the range of about 30 to about 60 mils.

10. A process as defined in claim 6 wherein said seed material is a single crystal.

11. A process as defined in claim 6 wherein said seed material, carbon source and catalyst-solvent are positioned in stacked planar relationship with said reactor vessel.

12. In a process for the production of diamond material comprising the steps of:
(i) providing a reaction vessel containing a diamond seed material and a source of carbon separated by a mass of catalyst-solvent for the diamond-making process;
(ii) providing means for applying high temperature and high pressure to said reaction vessel;
(iii) inserting said reaction vessel in said means for applying high temperature and high pressure; and
(iv) subjecting said reaction vessel to operating conditions of temperature and pressure in the diamond stable region of the phase diagram for carbon to create a predetermined temperature gradient in said reaction vessel in a matter such that said diamond seed material is at a temperature near the minimum value of temperature for the temperature gradient at substantially the same time said source of carbon is at a temperature near the maximum value of temperature for said temperature gradient; the improvement in said process comprising the step of interposing in the reaction vessel, before the reaction vessel is inserted in said means for applying high temperature and high pressure, a nucleation suppressing layer, different from said mass of catalyst-solvent, in contact with said mass of catalyst-solvent and having at least one opening therein between said diamond seed material and said mass of catalyst-solvent at said operating conditions to suppress spurious nucleation in the vicinity of the seed material, said nucleation suppression material being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of these metals, said metal capable of holding back diamond nucleation thereby suppressing unwanted spontaneous diamond nucleation; and the catalyst-solvent material includes at least one small lump extending through said opening in said nucleation suppressing layer to interconnect said mass of said catalyst-solvent material and said diamond seed material, said lump having an equivalent cross-sectional diameter in the range of from greater than 0.020 to 0.100 inches, whereby starting growth flaws collect in said lump and diamond growth greater than about 1/20 carat is produced.

13. A process as defined in claim 12 wherein said diamond seed material is a single crystal.

14. A process as defined in claim 13 wherein the diamond seed is oriented with a cube face thereof in contact with said lump of catalyst-solvent.

* * * * *